Feb. 3, 1970     E. MARTINEZ     3,493,108
CONCENTRATION OF ASBESTOS ORE
Filed May 10, 1967     5 Sheets-Sheet 1

INVENTOR
EDWARD MARTINEZ
BY
ATTORNEY

INVENTOR
EDWARD MARTINEZ
BY
Elwood J. Schaffer
ATTORNEY

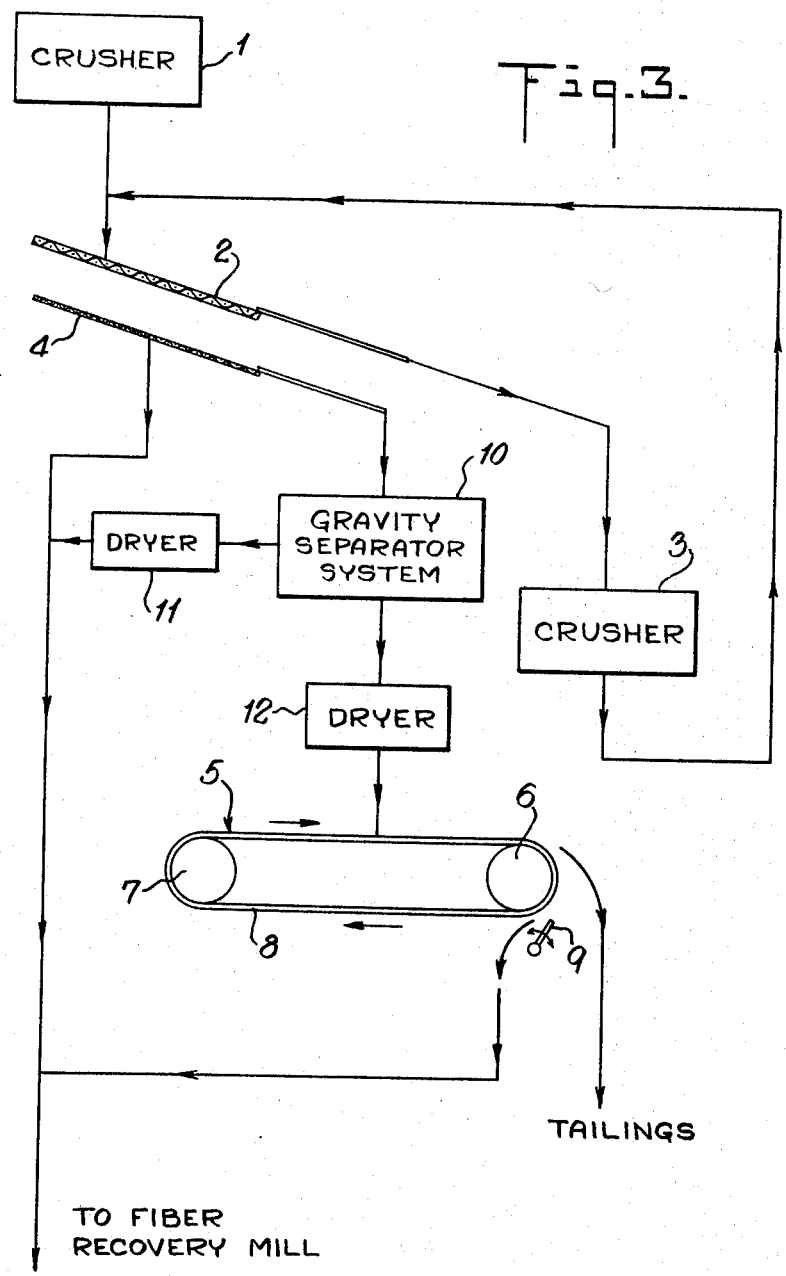

Feb. 3, 1970  E. MARTINEZ  3,493,108
CONCENTRATION OF ASBESTOS ORE
Filed May 10, 1967  5 Sheets-Sheet 4
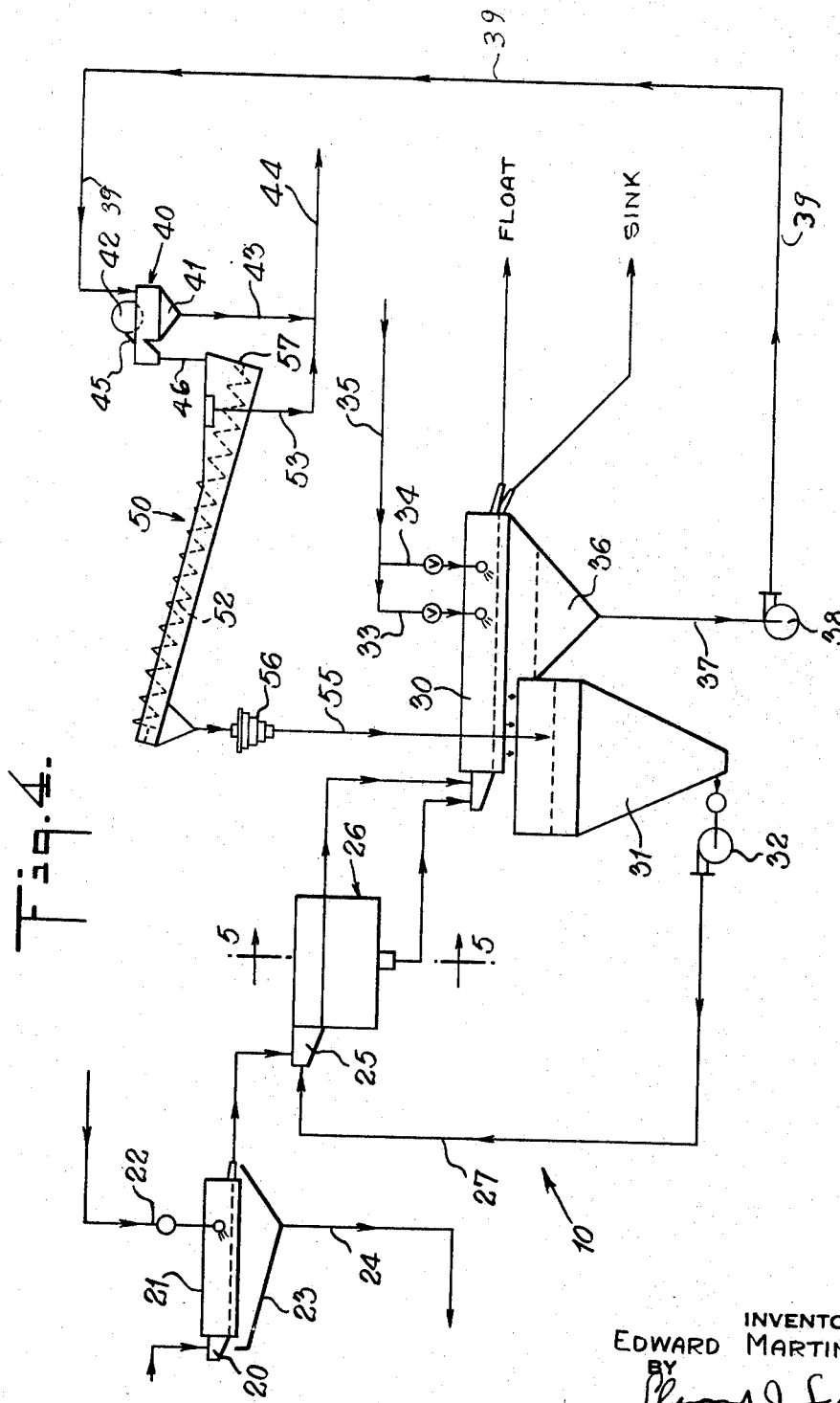
INVENTOR
EDWARD MARTINEZ
BY
ATTORNEY

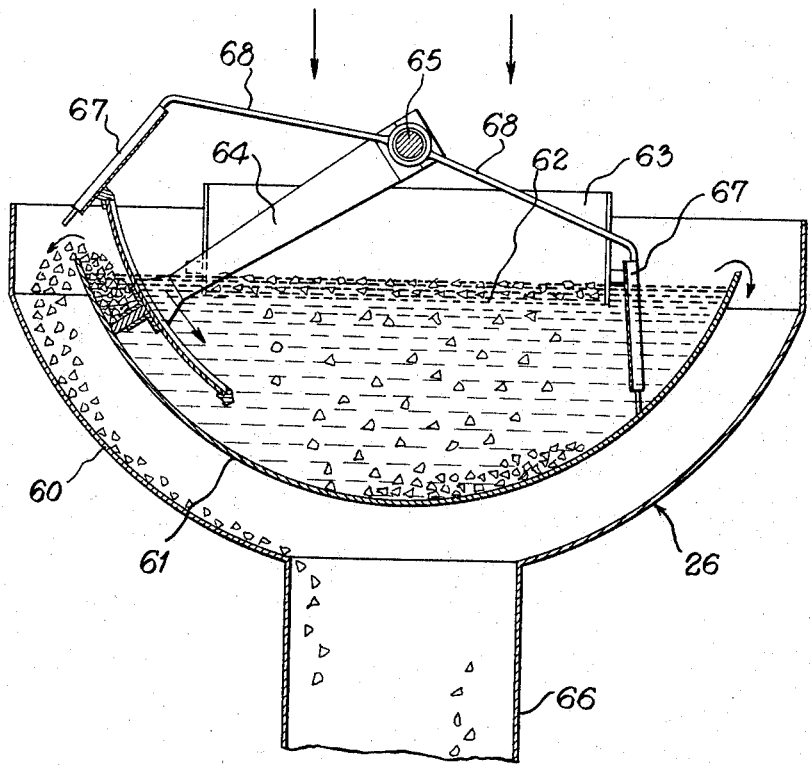

United States Patent Office 3,493,108
Patented Feb. 3, 1970

3,493,108
CONCENTRATION OF ASBESTOS ORE
Edward Martinez, North Plainfield, N.J., assignor to American Smelting and Refining Company, New York, N.Y., a corporation of New Jersey
Continuation-in-part of application Ser. No. 386,572, July 31, 1964. This application May 10, 1967, Ser. No. 637,589
Int. Cl. B03d 3/00; B03c 1/00
U.S. Cl. 209—3     18 Claims

ABSTRACT OF THE DISCLOSURE

A method of concentrating asbestos ore which comprises the steps of subjecting an asbestors ore that has not been fiberized to a combined operation such as a sink-float gravity concentration step and a magnetic concentration step to further concentrate the desired asbestos fiber bearing particles.

CROSS-REFERENCES TO RELATED APPLICATIONS

This application is a continuation-in-part application of my co-pending United States application Ser. No. 386,572, filed July 31, 1964, now U.S. Patent No. 3,328,-233.

BACKGROUND OF THE INVENTION

Field of the invention

This invention relates to concentration of asbestos ore. More particularly it relates to concentrating serpentine type of asbestos ore.

Description of the prior art

In the conventional procedure for recovering asbestos fiber, asbestos ore is milled to free and fiberize the fiber contained in the ore after which the freed fiber is recovered by aspiration. Heretofore, except for such fiberizing and aspiration, it was not thought possible in the art that asbestos ore could be beneficated by concentration by procedures based upon physical properties of the ore. I have discovered that asbestos can be beneficated by such procedures. Thus, I have found that incompletely altered asbestos ore and especially incompletely serpentinized chrysotile-bearing asbestos ore, can be concentrated by gravity separation procedures.

SUMMARY OF THE INVENTION

Broadly the invention comprehends subjecting a mixture of fiber-bearing and non-fiber-bearing asbestos ore particles obtained from an asbestos ore, especially an incompletely altered asbestos ore and particularly an incompletely serpentinized chrysotile-bearing asbestos ore, to a gravity separation step and separating in said gravity separation step a mixture of ore particles having an asbestos fiber content which is richer than that of the mixture introduced to the gravity separation step. In the preferred procedure, especially in practicing the invention with such chrysotile-bearing ore, there is separated in the gravity separation step a mixture of particles having a lower specific gravity and a richer asbestos fiber content than that of the mixture of ore particles introduced to the gravity separation step.

One of the advantages of the invention is that it provides a physical procedure for concentrating asbestos ore. A further advantage is that it provides a procedure for separating fiber-bearing or fiber-rich ore particles from non-fiber-bearing or fiber-poor ore particles. Another advantage is that a wet procedure may be employed to concentrate the asbestos ore while the asbestos fibers are still embedded in the ore particle thereby avoiding or reducing wetting of the fiber. A further advantage of the invention is that it provides a procedure for concentrating asbestos ore in which fiber-free or fiber-poor ore particles are separated from ore at an early stage or stages and before the fiberizing steps in the conventional procedure for recovering asbestos fiber from asbestos ore, thereby increasing the grade of the asbestos-bearing material which in turn results in a reduction of the load in a plant or permits an effective increase in capacity of a given plant. Another advantage is that the invention provides a comparatively simple and inexpensive procedure for concentrating an asbestos ore. Another very important advantage is that the invention permits the exploitation of lower grades of ore than would otherwise be possible in the absence of the invention. A further extremely important advantage of the invention is that it permits the useful life of a mine to be extended. In addition, use of selective mining may be reduced or eliminated by practice of the invention. These and other advantages will become apparent from the following more detailed description of the invention.

The invention may be conducted with any asbestos ore. However, it is more advantageously used in connection with an incompletely altered asbestos ore; and, it is most advantageously used in connection with incompletely serpentinized chrysotile-bearing asbestos ores, especially those of the type found in Quebec, Canada. The mixture of ore particles for feeding to the gravity separation system may be prepared in any manner. Thus, for example, the invention may be practiced to concentrate the mixture of ore particles occurring as a result of crushing or milling steps at any one or more of the stages in the conventional procedure employed for recovering asbestos fiber from asbestos ore, including but not limited to, the mixture of ore particles as taken from the mine and the mixture of particles produced in any crushing or milling stage thereafter. Preferably ore particles obtained as a result of impact crushing are employed in practicing the invention. In a preferred procedure, the invention is practiced on at least a portion of the ore particles remaining after removing particles in a desired size range from a mixture of ore particles. Preferably the size of the ore particles treated in accordance with the invention are crushed particles which are not smaller than the oversize particles from a 10-mesh Tyler screen, i.e. a screen having square openings which are 0.065 inch on a side. Preferably also the crushed particles are sufficiently small to pass through a screen having square openings which are six inches on a side. Most preferably the particles fed into the gravity separation step are particles which pass through a screen in which the screen openings are 2 inches square and which are retained on a screen in which the screen openings are ¼ inch square. Most preferably also the invention is practiced at a stage in the conventional procedure employed to recover asbestos fiber from the ore, between the primary crushing step after removal of the ore from the mine and the first fiberizing steps.

In accordance with the invention, the asbestos-bearing material may be subjected to gravity separation in any gravity separating apparatus, for example, in wet or dry jigs, pans, rockers, classifiers, or in sink-float apparatus. In general gravity separation in a liquid is preferred to gravity separation in a non-liquid. Preferably the invention is practiced by gravity separation employing a so-called heavy liquid, i.e. a liquid as such or a liquid medium comprising a suspension of solids (media) in a liquid, having a desired density above that of water.

In the most preferred mode of practicing the invention, the sink-float procedure is employed in the gravity separation step. In this procedure a stream of the mixture of asbestos ore particles is fed into a heavy liquid which has a suitable density. Upon entering the liquid, the heavier particles (the so-called "sink") sink in the liquid while the lighter fragments (the so-called "float") float on or adjacent the liquid surface and thus separated portions are separately removed from the heavy liquid. Any suitable liquid or mixture of liquids or suspension of a solid in a liquid may be used as the heavy liquid. For example, the sink-float liquid may be a heavy hydrocarbon or mixtures thereof, an aqueous solution, or a suspension of finely divided solid media, especially solids having a high density such as galena, ferrosilicon, or magnetite. Preferably, the liquid for the sink-float procedure is a liquid suspension of controlled density obtained by suspending a suitable amount of a suitable solid in water. Most preferably, the sink-float liquid is a water suspension of ferrous material such as finely divided magnetite or ferrosilicon or both. The sink float separation may be conducted in any suitable apparatus under relatively turbulent or quiescent conditions. Thus, for example, it may be conducted in a relatively turbulent heavy liquid in a rotating drum or, more preferably, in a quiescent heavy liquid in a tank which may be square, rectangular or cone shaped.

In practicing the invention with a heavy liquid to concentrate a chrysotile-type asbestos ore, especially when a sink-float procedure is employed, the mixture of asbestos ore particles preferably are subjected to gravity separation in a heavy liquid having a density in the range 2.35–2.85 grams per cubic centimeter and separating from the heavy liquid as the float a mixture of ore particles having an asbestos fiber content which is richer than that of the mixture of particles fed to the heavy liquid. More preferably the heavy liquid has a density in the range 2.40–2.85 grams per cubic centimeter; a heavy liquid having a density in the range 2.48–2.85 grams per cubic centimeter being even more preferred. The most preferred heavy liquid is one having a density in the range 2.50–2.60 grams per cubic centimeter. It will be understood that the density of a heavy liquid may be determined by weighing a known volume of a representative sample of the heavy liquid and, from such determination, calculating the weight in grams of one cubic centimeter of the sample.

As already indicated, the invention may be practiced with the mixture of ore particles as such which is obtained as a result of a crushing step or other appropriate step for reducing the particle size of an asbestos-bearing material. However, in reducing the size of such material, especially in crushing and particularly in impact crushing a chrysotile-bearing asbestos ore, the fiber content of the particles in the particle size range unavoidably produced in a particular size reducing step tends to increase with decreasing size of particles. Preferably, in practicing the invention, and especially with a chrysotile-bearing asbestos material, a portion of the smaller particles is removed, preferably by screening, from the mixture of particles produced in the size reducing procedure, to obtain a fraction (mixture) of particles which has a fiber content which is richer than that of the material sent to the size reducing procedure; and, at least a portion of the mixture of the relatively large particles remaining after removal of such smaller particles is subjected to a gravity separation step. The particles removed as the portion of smaller particles may range from the smallest particle up to particles of any desired size in the mixture and such latter range of the smaller particles may be selected to take into said portion any desired proportion of the mixture of particles produced in the size reducing procedure. Generally, in practicing this feature, it is advantageous to so select the screens or other appropriate means for removal of the portion of smaller particles so as to take into such portion less than 95%, by weight, of the smaller particles produced in a particular size reduction procedure. Generally, however, it is more advantageous to take as the portion of the smaller particles, less than 70%, by weight of the smaller particles produced in a particular size reduction procedure. In the most advantageous procedure, less than 50%, by weight, of the smaller particles produced in a size reducing procedure are taken as the portion of the smaller particles.

The gravity separation procedure may be, and preferably is, practiced in combinaton with a magnetic concentrating procedure to concentrate an incompletely altered, magnetite-containing asbestos ore, and especially an incompletely serpentinized, magnetite-containing, chrysotile-bearing asbestos ore. The magnetic concentrating procedure may be combined in any way with the present gravity concentrating procedure to concentrate an asbestos ore material. Thus, for example, a magnet concentrating step may be practiced at any one or more of the stages in the procedure employed for recovering asbestos fiber from asbestos ore, either in parallel or before or after one or more of the instant gravity concentration step or steps. Likewise, a magnetic concentrating procedure together with the instant gravity separation procedure may be, a preferably is, practiced in combination with the procedure for removal of the smaller particles set forth in the preceding paragraph; the latter procedure preferably preceding the magnetic and gravity procedures. In employing a combination of gravity and magnetic procedures, it is preferable to use a sequence in which one such procedure follows the other immediately or as closely as practicable. In one preferred procedure the heavy fraction from the gravity procedure is, after drying where drying is desirable or advantageous, subjected directly to a magnetic concentrating procedure. In another and more preferred procedure, the non-magnetic or relatively non-magnetic fraction from the magnetic procedure is subjected directly to a gravity separation procedure. Preferably, a sequential combination of magnetic and gravity concentrating procedures is employed to separate a mixture of ore particles, which has a higher specific gravity, is less magnetic and has a leaner fiber content than the ore particles introduced to the first of these two procedures.

The magnetic concentrating procedure employed in conjunction with the gravity separating procedure of the invention comprehends introducing the mixture of particles to be treated into a magnetic field and separating from the particles in said field a mixture of magnetic particles having an asbestos fiber content which is richer than that of the mixture introduced to the magnetic field.

The magnetic field employed may be established in any suitable way using any suitable means. Thus a permanent magnet or an electromagnet may be employed to establish the field. At present permanent magnets are preferred because of their relative simplicity, convenience and cost. In general, the magnetic susceptibility of fiberbering ore particles in a mixture of particles obtained from a magnetite-containing asbestos ore may vary from relatively strong to very weak. For any given mixture of ore particles, the range of magnetic susceptibility displayed by the particles contained in the mixture will depend upon the source of the ore, the particle size and particle size distribution in the mixture, the manner and means used to prepare the mixture, and the magnetite content of the ore as well as the fiber content of the individual ore particle. In general also, with a mixture of ore particles of a given size or within a given size range and which have been obtained from the same ore source, the magnetic susceptibility of the individual ore particles will vary with the fiber content of the particles. I have found that, for any given condition, an increase in the intensity of the magnetic field results in an increase in the weight of the separated fiber-rich fraction and a decrease in the fiber value per ton, in that fraction; and that a decrease in the magnetic field intensity reduces the weight of the spearated fiber-rich fraction and increases the fiber value, per ton, of such fraction. In accordance with the foregoing, in practicing the magnetic separating step to effect a desired degree of separation of fiber-containing ore particles in a given mixture of such particles, the mixture is preferably subjected to a magnetic field of a predetermined intensity, i.e. an intensity which has previously been determined to effect the desired separation of such particles.

It will be understood that, in the art, the fiber value in dollars per ton of an ore or ore fraction is determined by a determination of the quantity and quality of the fiber contained in the ore in question. For purposes of this application, the value of the fiber contained in an ore is determined by The Method of Testing Asbestos Fiber, approved by the Quebec Asbestos Mining Association as revised in July 1959, published August 1, 1959.

The invention is further illustrated in the accompanying drawings and in the following examples. It should be understood, however, that the drawings and examples are given for purposes of illustration and that the invention in its broader aspects is not limited thereto.

BRIEF DESCRIPTION OF THE DRAWINGS

In the drawings:

FIG. 3 is a flow sheet diagrammatic in nature illustrating another mode of practicing the invention, to concentrate a magnetite-containing asbestos ore.

FIG. 4 is a flow sheet diagrammatic in nature illustrating the most preferred gravity separating procedure for practicing the invention.

FIG. 5 is a cross-sectional view, diagrammatic in nature, of the preferred sink-float apparatus, taken along the line 5—5 passing through the tank 26 shown in FIG. 4.

In the drawings, like numbers refer to like elements. Referring now to FIG 1 of the drawings, the numeral 1 represents a crusher. Ore to be crushed, which may be ore from the mine or previously crushed ore, is fed into the crusher and the crushed ore is discharged upon the top of a first screen 2. The oversize ore particles remaining in the top of screen 2 are recrushed in crusher 3 and recycled to screen 2. The ore particles passing through screen 2 are fed to screen 4 and further screened thereon. The ore particles passing through screen 4 may be further processed in a conventional manner to recover asbestos fiber contained in the particles. The ore particles remaining on screen 4 are fed to gravity separation system indicated generally by the numeral 10, in which they are separated into two mixtures; one mixture being relatively rich in fiber content and the other relatively poor in fiber content. The relatively rich fiber mixture may be further processed in a conventional manner to recover the fiber contained in the mixture. The relatively poor fiber mixture may be discarded or depending upon its fiber content may be further treated to concentrate it. In the preferred procedure, especially in concentrating incompletely serpentinized chrysotile-bearing ore, the fiber-rich mixture is separated in apparatus 10 as a mixture having a lower specific gravity than that of the mixture of particles passed to the separation apparatus 10.

DESCRIPTION OF THE PREFERRED EMBODIMENTS

Figure 2:
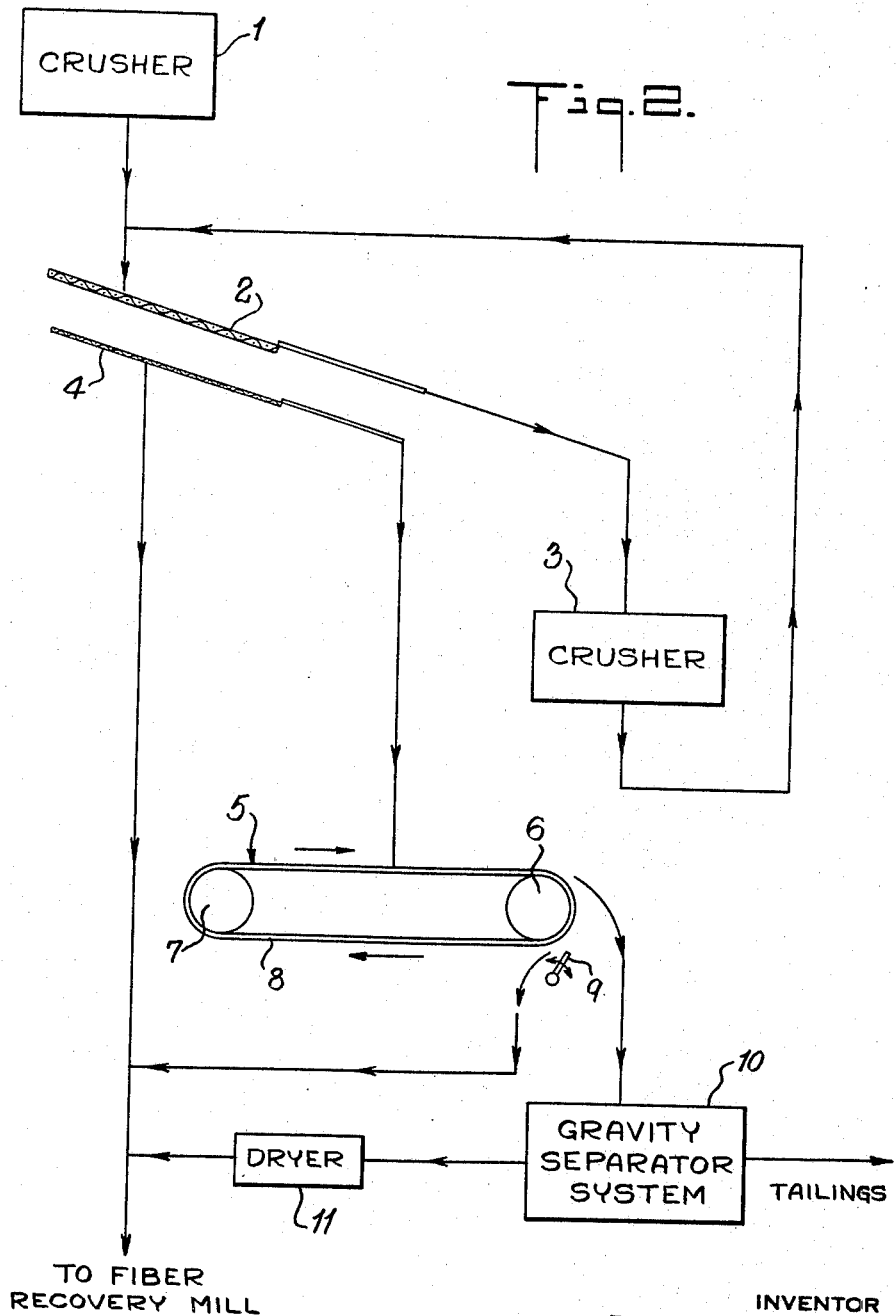
FIG. 2 is a flow sheet diagrammatic in nature illustrating the presently preferred mode of practicing the invention to concentrate magnetic-containing asbestos ore.

The preferred method of concentrating an incompletely serpentinized, magnetite-containing, chrysotile-bearing ore is shown in FIG. 2. In this preferred method, the ore particles remaining on screen 4 are fed to a magnetic separator which may be magnetic pulley separator 5 of the type illustrated in the drawing which, as shown, is provided with magnetic pulley 6, non-magnetic pulley 7, non-magnetic endless belt 8 which may be fabricated of rubber or canvas or other suitable material, and adjustable splitter or divider means 9. The ore particles fed onto belt 8 are passed over magnetic pulley 6, the non-magnetic or relatively non-magnetic ore particles on the belt being discharged from the pulley to the right of splitter 9 and the magnetic ore particles being discharged to the left of splitter 9. The fiber-rich magnetic ore particles may be sent to a conventional mill (not shown) and may be further processed therein in a conventional manner to free and recover the asbestos fiber contained therein. The non-magnetic ore particles are sent to gravity separation apparatus 10 in which preferable there is separated a mixture of particles having a richer fiber content and a lower specific gravity than that sent to aparatus 10 and a mixture of particles having a poorer fiber content and a higher specific gravity than the mixture passed to the apparatus 10. The fiber-rich mixture from separator 10 may also be sent to a conventional mill for freeing and recovering the fiber contained therein. If desired, the fiber-rich mixture may be dried in dryer 11 after removal from separator 10. The fiber-poor mixture may be discarded from the process. It will be understood that, in practicing the invention, any free fiber (as opposed to ore particles containing fiber) that is produced as a result of the crushing, screening or handling of the ore may be removed in any conventional manner at any time.

Means may be provided to vary the speed of belt 8. Magnetic pulley 6 of magnetic separator 5 may be either a conventional electromagnet or a conventional permanent magnet. Preferably pulley 6 is permanently magnetic. Preferably also, pulley 6 is selected to provide a magnetic field of the highest practicable intensity. In operation, with this preferred arrangement, the speed of belt 8 and the setting of the adjustable splitter 9 are preferably adjusted to effect the desired separation of the ore particles fed onto the belt. Preferably, also, the ore particles are fed to the belt so as to be disposed thereon as a single layer of ore particles.

It has been found that, under any given conditions, an increase in belt speed is similar in effect to a decrease in the intensity of the magnetic field and a decrease in belt speed is similar in effect to an increase in the magnetic field intensity. Likewise, it has been found that under any given conditions, shifting splitter 9 to the left is similar in effect to a decrease in the intensity of the magnetic field while shifting splitter 9 to the right is similar in effect to increasing the magnetic field. Thus, for example, an increase in belt speed, or shifting the splitter 9 to the left, results in a decrease in the weight of the separated fiber-rich fraction and an increase in the fiber values of that fraction while a decrease in belt speed or shifting splitter 9 to the right results in an increase in the weight of the separated fiber-rich fraction and a decrease in the fiber value of that fraction.

The process shown in FIG. 3 is the same as that shown in FIG. 2 except that the ore particles remaining on screen 4 are passed first to gravity separator 10. In the latter, there preferably is separated a mixture of particles which is richer in fiber content and lower in specific gravity than is the mixture sent to separator 10; and such fiber-rich mixture may also be sent to a conventional mill (not shown) for freeing and recovering the fiber contained therein. If desired, such fiber-rich mixture may be dried in dryer 11 before recovering the fiber contained therein. There is also separated in gravity separator 10, a mixture of particles which is poorer in fiber content and higher in specific gravity than is the mixture of particles sent to apparatus 10. Such fiber-poor mixture is sent to magnetic separator 5. If desired, the fiber-poor mixture may be dried in dryer 12 before being sent to separator 5. In the latter, there is separated a fraction (mixture) of magnetic particles having a richer fiber content than that of the mixture of particles sent to separator 5. Such fiber-rich magnetic particles may also be sent to a conventional mill for freeing and recovering the fiber contained therein. The relatively non-magnetic ore particles discharged to the right of splitter 9 may be discarded from the process.

The preferred gravity separation procedures and apparatus therefor are illustrated in FIG. 4. As shown, the mixture of ore particles to be treated are fed onto chute 20 of wet screen 21 supplied by fresh water through line 22. The wash water from screen 21 is collected in tank 23 from which it may be withdrawn through line 24 and discarded. However, the wash water may contain free fiber washed from the ore on screen 21 and, before discarding the wash water, the free fiber contained therein may be recovered therefrom by cyclones, screens, filtering or decantation or in any other appropriate manner. The washed ore from screen 21 is fed into chute 25 of sink-float separator tank 26. The ore in chute 25 is carried into separator 26 by recycled heavy liquid fed to chute 26 through line 27. As indicated earlier, the heavy liquid preferably comprises a water suspension of finely divided solids which preferably are finely divided particles of ferrosilicon or magnetite or mixtures thereof; a sufficient amount of the finely divided solids being suspended in the water to provide a suspension of desired specific gravity.

Figure 1:
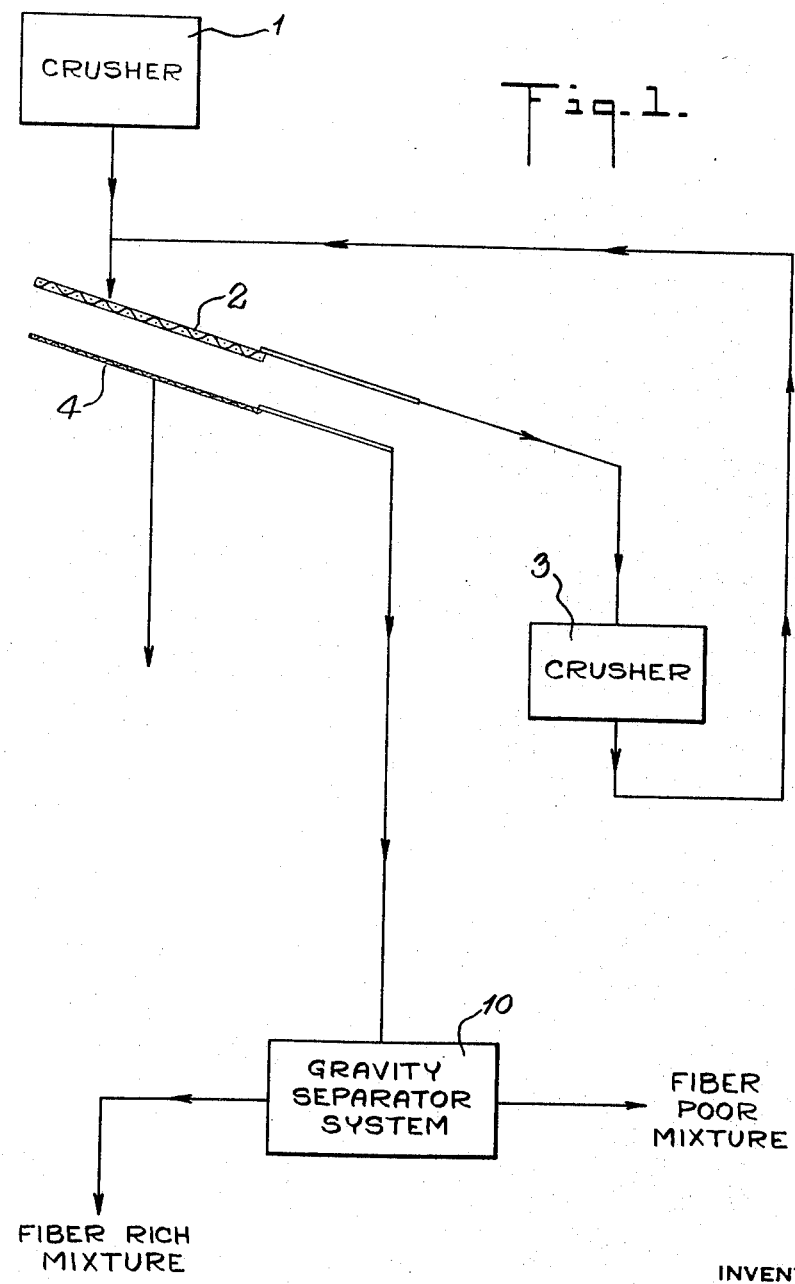
FIG. 1 is a flow sheet diagrammatic in nature illustrating a generally referred mode of practicing the invention.

In sink-float tank 26, the heavy particles sink in the heavy liquid and the lighter particles float thereon. The heavy partcles (the so-called "sink") together with heavy liquid are withdrawn separately from tank 26 and are sent to one side of a longitudinally partitioned screen 30. The light particles (the so-called "float") together with heavy liquid are sent to the other side of longitudinally partitioned screen 30. The heavy liquid flowing with the sink and the float from tank 26 onto the initial portion of screen 30 above tank 31 passes through the screen into the tank from which it is recycled by means of pump 32 and line 27 to sink-float tank 26. The sink particles and the float particles pass down their respective sides of screen 30 under a plurality of banks of washing sprays 33 and 34 supplied by water through line 35 from a source not shown. When the heavy liquid employed in tank 26 possesses a specific gravity in the range 2.35–2.85 grams per cubic centimeter, the float is a mixture of ore particles which is richer in fiber content and lower in specific gravity than is the mixture of ore particles constituting the sink. Such float (the relatively fiber-rich mixture of ore particles) and sink (the relatively fiber-poor mixture of ore particles) may be further treated as indicated in FIGS. 1 through 3 or in any other appropriate manner to recover fiber contained therein.

The wash water from sprays 33 and 34 is collected in tank 36 and may contain an appreciable amount of the ferrous solid media used to provide the desired density in the heavy liquid used in sink-float tank 26. Such solid media may be recovered and returned to the process by passing it via line 37, pump 38, and line 39 to an appropriate magnetic separator 40. The latter may comprise a suitable tank 41 provided with a rotatable magnetic drum 42 suitably mounted therein to which the ferrous media solids are attracted and held, thereby being removed from the wash water. The residual wash water which may contain nonmagnetic matter is withdrawn through line 43 and passed to discard through line 44. The media solids adhering to drum 42 may be removed therefrom by suitable means, such as scraper 45 suitably attached to tank 41, and the removed wet solids may then be delivered through line 46 to a suitable dewater means 50 which may be provided with a settling tank 51 and a screw elevator 52. The water removed from the wet solids in dewatering means 50 may be discharged through line 53 and discarded through line 44. The dewatered media discharged from the top of screw elevator 52 may be passed through line 55 provided with demagnetizing coil 56 to tank 31. Demagnetization of the ferrous solids by coil 56 is desirable to prevent subsequent flocculation of the solids in the heavy liquids.

Sink-float tank 26 is illustrated in greater detail in FIG. 5. As shown, tank 26 may comprise an outer tank 60 and an inner tank 61 suitably mounted therein. The heavy liquid and ore particles fed onto chute 25 (see FIG. 4) are introduced into inner tank 61 at the surface level of the heavy liquid pool in the inner tank. The particles which float are carried across the surface of the pool by the moving heavy liquid and are discharged with the latter over discharge lip 62 into chute 63 from which the liquid and particles are fed onto one side of screen 30. The sink particles drop to the bottom of tank 61 and are removed by rake 64 mounted on shaft 65 which in turn is mounted on the tank 61 by suitable means not shown. Rake 64 is oscillated on shaft 65 by suitable means not shown to discharge sink particles on each side of tank 61 into tank 60. The sink particles together with heavy liquid in tank 60 pass into chute 66, are fed therefrom onto the other side of screen 30. Barrier screens attached to arms 68 mounted on shaft 65 are provided to prevent or reduce loss of float particles with the sink particles removed from tank 61.

EXAMPLE 1

Ore from the Black Lake mines of Lake Asbestos of Ouebec Limited, located at Black Lake, Province of Quebec, was treated by the procedure illustrated in FIG. 1. The ore from the mine is typical of the incompletely serpentinized, magnetite-containing, chrysotile-bearing asbestos ore found in the Province of Quebec, Canada. Ore from the mine, after being crushed in a primary crusher 1 and screened through a screen 2 was fed onto screen 4. The screen openings in screen 2 were rectangular openings which were 4 inches by 5 inches on the sides. Screen 4 was a rod screen comprised of parallel rods spaced ½ inch apart. The value of the fiber contained in the ore fed to the primary crusher 1 was $8.14 per ton. The mixture of particles passing through screen 4 amounted to 34% by weight of the ore fed to crusher 1 and the value of the fiber contained in this mixture was $20.15 per ton. The mixture of particles which passed over screen 4 was subjected to gravity separation by the sink-float procedure illustrated in FIG. 4. The specific gravity of the heavy liquid in tank 26 was 2.69 grams per cubic centimeter and was obtained by suspending suitable amounts of finely divided ferrosilicon and magnetite in water. The particles which floated on the heavy liquid (i.e. the float) and the particles which sank in the heavy liquid (i.e. the sink) were separately recovered from the liquid. The mixture of particles passing over screen 4 amounted to 66% by weight of the ore fed to crusher 1 and the value of the fiber contained therein was $1.86 per ton. The float from the sink-float separation amounted to 50% by weight of the ore fed to crusher 1 and the value of the fiber contained in the float was found to be $2.28 per ton. The sink amounted to 16% by weight of the ore fed to crusher 1 and the value of the fiber contained in the sink was found to be $1.71 per ton. From the foregoing, it will be seen that the ore treated by the procedure was concentrated and that each ton of the ore which had a fiber content of $8.14 per ton was concentrated to 0.84 ton of concentrate having a fiber value of $9.43 per ton.

EXAMPLE 2

In this example, the particles passing over screen 4 in the procedure set fourth in Example 1 were further crushed in a secondary crusher and the particles discharged from the secondary crusher were screened on a first screen which possessed square openings which were one inch on a side and then on a second screen having square openings ¼ inch on the side. The particles passing over the larger of the two screens (i.e. the screen in which the openings were 1 inch square) were recycled to the secondary crusher. The particles passing through the smaller of the two screens (i.e. the screen in which the openings were ¼ inch square) constituted 16% by weight of the feed to crusher 1 in Example 1 and the value of the fiber contained in such smaller particles was $4.62 per ton. The particles passing through the larger and over the smaller of the two screens constituted 50% by weight of the feed to crusher 1 of Example 1 and the value of the fiber therein was $0.98 per ton. These larger particles were subjected to gravity separation by the sink-float procedure illustrated in FIG. 4 in a heavy liquid comprising a suspension of ferrosilicon and magnetite in water and having a specific gravity of 2.51 grams per cubic centimeter. The float from the sink-float procedure was 2.5% by weight of the feed to crusher 1 in Example 1 and the value of the fiber contained in the float was $6.76 per ton. The sink was 47.5% by weight of the feed to crusher 1 of Example 1 and the value of the fiber in the sink was $0.48 per ton. From the foregoing, it will be seen that each ton of the ore from the mine which, as stated in Example 1, had a fiber value of $8.14 per ton was concentrated to 0.525 ton of concentrate having a fiber value of $14.84 per ton.

EXAMPLE 3

In this example a crushed and screened mixture of asbestos fiber-bearing and non-fiber-bearing ore particles was employed. The mixture was obtained from the plant of Lake Asbestos of Quebec Limited at Black Lake, Province of Quebec, Canada and was produced from ore from the Company's Black Lake mine. The mixture comprised crushed particles which passed through a screen having square openings 1⅛ inches square and which passed over a screen having square openings ¾ inch square; the typical value of the fiber in the mixture was $1.85 per ton. The mixture was fed to a magnetic pulley separator 5 as illustrated in FIG. 2. The diameter of pulleys 6 and 7 was 24 inches, pulley 6 was a high intensity permanent magnet, belt 8 was 48 inches wide, the belt speed was 175 feet per minute and the ore was charged to the belt at the rate of 30 tons per hour. The position of splitter 9 was adjusted to provide a non-magnetic fraction in which the value of the contained fiber was below one dollar per ton. Typically the magnetic fraction constituted 29% by weight of the mixture fed to the magnetic separator 5 and the value of the contained fiber in the magnetic fraction was $4.32 per ton. The non-magnetic fraction constituted 71% by weight of the mixture fed to the magnetic separator 5 and the value of the fiber contained therein was $0.34 per ton. From the foregoing tion was subjected to gravity separation by the sink-float procedure illustrated in FIG. 4 in a heavy liquid having a specific gravity of 2.52 grams per cubic centimeter; the heavy liquid being obtained by suspending suitable amounts of ferrosilicon and magnetite in water. The float from the sink-float procedure constituted 11% by weight of the mixture fed to the magnetic separator 5 and the value of the fiber contained in the float was $3.03 per ton. The sink constituted 60% by weight of the mixture fed to the magnetic separator and the value of the fiber contained therein was $0.34 per ton. From the foregoing, it will be seen that each ton of the material treated in this procedure, which had a fiber value of $1.85 per ton was concentrated to 0.4 ton of concentrate having a fiber value of $3.96 per ton.

EXAMPLE 4

In this example a crushed and screened mixture of asbestos fiber-bearing and non-fiber-bearing ore particles was also employed. However in this example the mixture was subjected to gravity concentration and magnetic concentration as illustrated in FIG. 3. The mixture was again obtained from the plant of Lake Asbestos of Quebec Limited at Black Lake, Province of Quebec and was produced from ore from the Company's Black Lake mine. The mixture comprised crushed particles which passed through a screen having square openings one inch square and which passed over a screen having square openings ¼ inch square; the value of the fiber in the mixture was $0.98 per ton. The mixture subjected to gravity separation in gravity separator 10 (see FIG. 3) by the sink-float procedure illustrated in FIG. 4 using a heavy liquid having a specific gravity of 2.51 grams per cubic meter. The heavy liquid was obtained by suspending suitable amounts of ferrosilicon and magnetite in water. The float from the sink-float procedure constituted 5% by weight of the mixture fed to gravity separator 10 and the value of the fiber contained in the float was $6.76 per ton. The sink constituted 95% by weight of the mixture fed to gravity separator 10 and the value of the fiber contained in the sink was $0.67 per ton. The sink was fed to a magnetic pulley separator 5 as illustrated in FIG. 3. The magnetic separator was provided with an electromagnetic pulley 6 which was 15 inches in diameter. A current of 7½ amperes at 130 volts was passed through the electro-magnetic while the sink was being subjected to the magnetic separation. The belt speed employed for belt 8 was 137 feet per minute. The sink fed to belt 8 was disposed on the belt in a layer which was one particle in thickness. The position of splitter 9 was adjusted to provide a non-magnetic fraction in which the value of the contained fiber was relatively low. The magnetic fraction constituted 31% by weight of the mixture fed to gravity separator 10 and the value of the fiber contained in the magnetic fraction was approximately $1.55 per ton. The nonmagnetic fraction constituted 64% by weight of the mixture fed to gravity separator 10 and the value of the fiber contained therein was approximately °0.25 per ton. From the foregoing, it will be seen that each ton of the material treated in this procedure, which had a fiber content of $0.98 per ton was concentrated to $0.36 ton of concentrate having a fiber value of $2.28 per ton.

What is claimed is:

1. A method of concentrating asbestos ore contained in a mixture of fiber-bearing and non-fiber-bearing ore particles obtained from an incompletely serpentinized, magnetite-containing, chrysotile-bearing asbestos ore which comprises prior to a first fiberizing step, subjecting ore particles in said mixture obtained from crushing the ore, in a desired sequence, to a sink-float separation step in a liquid of a suitable density and to a magnetic separation step in a magnetic field, separating from an ore particle mixture in said sink-float separation step primarily a mixture of ore particles having embedded therewithin an asbestos fiber content which is richer than that of the mixture of particles fed to the sink-float separation step, and separating from an ore particle mixture in a magnetic field in said magnetic separating step a mixture of magnetic particles having embedded therewithin an asbestos fiber content which is richer than that of the mixture of particles fed to the magnetic field.

2. A method according to claim 1 in which said sink-float separation step is practiced before said magnetic separation step, said magnetic separation step being practiced on a higher specific gravity, fiber-poorer ore particle fraction from the sink-float separation step.

3. A method according to claim 1 in which said magnetic separation step is practised before said sink-float separation step, said sink-float separation step being practised on a less magnetic, fiber-poorer ore particle fraction from the magnetic separation step.

4. A method according to claim 1 in which the fiber-bearing and non-fiber-bearing ore particles subjected to the sink-float separation and magnetic separation steps are of a size such as to be retained on a 10 mesh screen and pass through a screen having 6 inch square openings.

5. A method of concentrating an incompletely serpentinized, magnetite-containing, chrysotile-bearing asbestos ore material which comprises prior to a first fiberizing step, subjecting the material to a crushing step to obtain a mixture of asbestos fiber-bearing and non-fiber-bearing ore particles in a range of sizes, removing from said mixture a portion of the smaller ore particles contained therein thereby to obtain as said removed portion a fraction of particles having embedded therewithin an asbestos fiber content which is richer than that of the ore particle mixture fed to said crushing step, introducing the particles remaining after removal of said portion of said smaller particles into a magnetic field, separating from the particles in said field a mixture of magnetic particles having embedded therewithin an asbestos fiber content which is richer than that of the mixture of particles introduced to said magnetic field, subjecting the particles remaining after said removal of said magnetic particles to a sink-float separation step in a liquid of a suitable density and separating from the particles in said sink-float separation step primarily a mixture of ore particles having embedded therewithin an asbestos fiber content which is richer than that of the mixture of particles fed to said sink-float separation step.

6. A method according to claim 5 in which said portion of said smaller ore particles removed from the ore particle mixture resulting from the crushing step constitutes less than 95% by weight of the mixture fed to said crushing step, and the mixture of ore particles subjected to sink-float separation is subjected to sink-float separation in a liquid having a density in the range 2.35 to 2.85 grams per cubic centimeter.

7. A method according to claim 5 in which said portion of smaller ore particles removed from the ore particle mixture resulting from the crushing step constitute less than 70% by weight of the mixture fed to said crushing step, and the mixture of ore particles subjected to sink-float separation is subjected to sink-float separation in a liquid having a density in the range 2.40 to 2.85 grams per cubic centimeter.

8. A method according to claim 5 in which said portion of smaller ore particles removed from the ore particle mixture resulting from the crushing step constitutes less than 50% by weight of the mixture fed to said crushing step, and the mixture of particles subjected to sink-float separation is subjected to sink-float separation in a liquid having a density in the range 2.48 to 2.85 grams per cubic centimeter.

9. A process according to claim 8 in which said liquid has a density in the range 2.50 to 2.60 grams per cubic centimeter and the liquid comprises a finely divided suspension of ferrosilicon and magnetite suspended in water.

10. A method of concentrating asbestos ore which comprises prior to a first fiberizing step, subjecting a mixture of fiber-bearing and non-fiber-bearing asbestos ore particles obtained from crushing the ore, of a size such as to be retained on a 10 mesh screen and pass through a screen having 6 inch square openings and obtained from an incompletely serpentinized chrysotile-bearing asbestos ore to a sink-float separation step in a liquid having a density in the range 2.35–2.85 grams per cubic centimeter, and separating from said ore particle mixture in said sink-float separation step primarily a mixture of ore particles having a lower specific gravity and embedded therewithin a richer fiber content than that of the mixture introduced to said sink-float separation step.

11. A method according to claim 10 in which said liquid has a density in the range 2.40–2.85 grams per cubic centimeter.

12. A method according to claim 10 in which said liquid has a density in the range 2.48–2.85 grams per cubic centimeter.

13. A method according to claim 10 in which said liquid has a density in the range 2.50–2.60 grams per cubic centimeter.

14. A method according to claim 10 in which said liquid comprises a suspension of finely divided solids.

15. A method according to claim 14 in which said liquid is a water suspension of finely divided ferrous solids.

16. A method according to claim 15 in which said ferrous solids comprise ferrosilicon.

17. A method according to claim 15 in which said ferrous solids comprise magnetite.

18. A method of concentrating asbestos ore which comprises prior to a first fiberizing step, subjecting a mixture of fiber-bearing and non-fiber-bearing asbestos ore particles obtained from crushing the ore and of a size such as to be retained on a 10 mesh screen and pass through a screen having 6 inch square openings and obtained from an incompletely serpentinized chrysotile-bearing asbestos ore to a sink-float separation step in a liquid of a suitable density, and separating from said ore particle mixture in said sink-float separation step primarily a mixture of ore particles having a lower specific gravity and embedded therewithin a richer fiber content than that of the mixture introduced to said sink-float separation step.

References Cited

UNITED STATES PATENTS

| Number | Date | Name | Class |
|---|---|---|---|
| 2,386,713 | 10/1945 | Pharo | 19—66 |
| 2,874,838 | 2/1959 | Pharo | 209—18 |
| 455,638 | 7/1891 | Powers | 209—773 |
| 461,579 | 10/1891 | Johns | 209—39 |
| 1,714,438 | 5/1929 | Rose | 209—2 |
| 2,387,866 | 10/1945 | Walker | 209—172.5 |
| 2,500,154 | 9/1946 | Crocke | 209—40 X |
| 2,695,707 | 10/1954 | Pharo | 209—2 |
| 2,702,162 | 2/1955 | Lillis | 209—173 X |
| 2,711,822 | 6/1955 | Novak | 209—173 X |
| 2,850,166 | 9/1958 | Svensson | 209—172.5 X |
| 3,086,718 | 4/1963 | Lukas | 209—172.5 X |
| 3,328,233 | 6/1967 | Martinez | 209—214 X |
| 3,372,803 | 3/1968 | De Lisle | 209—214 X |

HARRY B. THORNTON, Primary Examiner

R. HALPER, Assistant Examiner

U.S. Cl. X.R.

209—40, 172.5, 214; 241—4

UNITED STATES PATENT OFFICE
CERTIFICATE OF CORRECTION

Patent No. 3,493,108      Dated February 3, 1970

Inventor(s) Edward Martinez

It is certified that error appears in the above-identified patent and that said Letters Patent are hereby corrected as shown below:

Column 5, line 30, "magnetic-containing" should be --magnetite-containing--. Column 6, line 15, "preferable" should be --preferably--. Column 9, line 49, "$0.34" should be --$0.85--. Column 9, lines 49 and 50, "From the foregoing tion" should be --The non-magnetic fraction--. Column 10, line 4, "mixture subjected" should be --mixture was subjected-- line 20, "electro-magnetic" should be --electro-magnet--; line 32, "°0.25" should be --$0.25--; line 35, "$0.36 ton" should be --0.36 tons--.

SIGNED AND SEALED

JUN 30 1970

(SEAL)
Attest:

Edward M. Fletcher, Jr.
Attesting Officer

WILLIAM E. SCHUYLER, JR.
Commissioner of Patents